US012782383B2

(12) United States Patent
Kong et al.

(10) Patent No.: US 12,782,383 B2
(45) Date of Patent: Nov. 3, 2026

(54) ACCELERATION SENSOR

(71) Applicant: AAC Kaitai Technologies (Wuhan) CO., LTD., Wuhan (CN)

(72) Inventors: Lingcheng Kong, Wuhan (CN); Shitao Yan, Wuhan (CN); Zhan Zhan, Wuhan (CN); Xiao Kan, Wuhan (CN); Zhao Ma, Wuhan (CN); Shan Yang, Wuhan (CN); Yang Li, Wuhan (CN); Kahkeen Lai, Singapore (SG); Qiuyu Tan, Singapore (SG)

(73) Assignee: AAC Kaitai Technologies (Wuhan) CO., LTD., Wuhan (CN)

( * ) Notice: Subject to any disclaimer, the term of this patent is extended or adjusted under 35 U.S.C. 154(b) by 236 days.

(21) Appl. No.: 18/820,311

(22) Filed: Aug. 30, 2024

(65) Prior Publication Data

US 2025/0231217 A1 Jul. 17, 2025

Related U.S. Application Data

(63) Continuation of application No. PCT/CN2024/072844, filed on Jan. 17, 2024.

(51) Int. Cl.

*G01P 15/18* (2013.01)
*G01P 15/125* (2006.01)
*G01P 15/08* (2006.01)

(52) U.S. Cl.

CPC ............ *G01P 15/18* (2013.01); *G01P 15/125* (2013.01); *G01P 2015/0831* (2013.01); *G01P 2015/0845* (2013.01)

(58) Field of Classification Search

None

See application file for complete search history.

(56) References Cited

U.S. PATENT DOCUMENTS

| | | | | |
|---|---|---|---|---|
| 10,393,770 | B2 * | 8/2019 | Acar | G01P 15/135 |
| 2013/0214367 | A1 * | 8/2013 | van der Heide | G01P 15/08 257/415 |
| 2021/0072280 | A1 * | 3/2021 | Liukku | G01P 15/125 |

FOREIGN PATENT DOCUMENTS

| | | | | |
|---|---|---|---|---|
| CN | 113156165 A * | 7/2021 | | G01P 15/125 |
| EP | 3882641 A1 * | 9/2021 | | G01P 15/18 |

* cited by examiner

*Primary Examiner* — Stephen D Meier
*Assistant Examiner* — Ruben C Parco, Jr.
(74) *Attorney, Agent, or Firm* — Wiersch Law Group

(57) ABSTRACT

An acceleration sensor, including a first acceleration detection unit configured to detect acceleration in an out-of-plane Z-axis direction, a second acceleration detection unit configured to detect acceleration in an in-plane X-axis direction and/or an in-plane Y-axis direction, a base, a connecting arm, a first anchor point, a first elastic member and a second elastic member. The first acceleration detection unit includes a first seesaw unit and a second seesaw unit arranged opposite to each other to define an annular structure. The annular structure surrounds an outer side of the second acceleration detection unit. The first anchor point is located at a middle part of the substrate, and the connection arm is fixed to the substrate through the first anchor point. The connection arm is located between the first acceleration detection unit and the second acceleration detection unit. A structure design thereof is reasonable and the anti-interference capability is great.

8 Claims, 13 Drawing Sheets

ACCELERATION SENSOR

TECHNICAL FIELD

The present disclosure belongs to the technical field of sensors, and in particular to an acceleration sensor.

BACKGROUND

An acceleration sensor includes one or more detection weights for detecting acceleration. For example, an acceleration sensor include a detection weight configured to move in a plane to detect acceleration in a plane of the detection weight, and is further configured to move out of a plane to detect acceleration in a plane perpendicular to the plane of the detection weight. The acceleration may be detected using a capacitive sensor coupled to the detection weight.

Currently, when an acceleration sensor detects in-plane acceleration and out-of-plane acceleration, an in-plane detection structure and an out-of-plane detection structure are respectively fixed to a base, so that an overall structure of the acceleration sensor is greatly affected by factors such as stress, which is not conducive to improving the anti-interference capability of the acceleration sensor.

SUMMARY

The present disclosure aims at solving at least one of the technical problems in the prior art and provides a new technical solution of an acceleration sensor.

In an aspect, an embodiment of the present disclosure provides an acceleration sensor, including: a first acceleration detection unit configured to detect acceleration in an out-of-plane Z-axis direction, the first acceleration detection unit including a first seesaw unit and a second seesaw unit, and the first seesaw unit and the second seesaw unit being arranged opposite to each other to define an annular structure; a second acceleration detection unit configured to detect acceleration in an in-plane X-axis direction and/or in an in-plane Y-axis direction, the annular structure surrounding an outer side of the second acceleration detection unit; a base, a connection arm and a first anchor point; the first anchor point being located at a middle part of the base, the connection arm being fixed to the base through the first anchor point, and the connection arm being located between the first acceleration detection unit and the second acceleration detection unit; and a first elastic member and a second elastic member, the first acceleration detection unit being connected to the connection arm through the first elastic member, and the second acceleration detection unit being connected to the connection arm through the second elastic member. The out-of-plane Z-axis direction, the in-plane X-axis direction and the in-plane Y-axis direction are perpendicular to each other.

As an improvement, the first acceleration detection unit further includes an out-of-plane displacement detection unit. A middle part of a side of the connection arm close to the second acceleration detection unit is fixed to the first anchor point. The first seesaw unit is elastically connected to a first end of the connection arm, the second seesaw unit is elastically connected to a second end of the connection arm; each of the first seesaw unit and the second seesaw unit is symmetrically distributed about a symmetry axis of the acceleration sensor; the first seesaw unit includes two first seesaw structures arranged at two sides of the symmetry axis, and the two first seesaw structures both rotate about a first rotation axis; the second seesaw unit includes two second seesaw structures arranged at two sides of the symmetry axis, and the two second seesaw structures both rotate about a second rotation axis; the first rotation axis and the second rotation axis are arranged in parallel and are both perpendicular to the symmetry axis. Each of the first seesaw unit and the second seesaw unit is provided with the out-of-plane displacement detection unit.

As an improvement, a first groove is provided at an outer side of the first seesaw unit, and a second groove is provided at an inner side of the second seesaw unit; a part of the first seesaw unit is embedded into the second groove, a part of the second seesaw unit is embedded into the first groove, to form an embedded structure; and the embedded structure is located between the first rotation axis and the second rotation axis.

As an improvement, the acceleration sensor further includes a first detection weight and a second detection weight. Each first seesaw structure includes a first rotating sub-portion and a second rotating sub-portion, the first rotating sub-portion and the second rotating sub-portion are located at two opposite sides of the first rotation axis, and the first groove is formed at an outer side of the second rotating sub-portion. Each second seesaw structure includes a third rotating sub-portion and a fourth rotating sub-portion, the third rotating sub-portion and the fourth rotating sub-portion are located at two opposite sides of the second rotation axis, and the second groove is formed at an inner side of the third rotating sub-portion. The first detection weight is located at the first rotating sub-portion, the second detection weight is located at the fourth rotating sub-portion, and the first detection weight and the second detection weight are symmetrically arranged.

As an improvement, the acceleration sensor further includes a coupling beam, the coupling beam extends in a direction perpendicular to the symmetry axis, an end of the coupling beam is connected to the second rotating sub-portion, and another end of the coupling beam is connected to the third rotating sub-portion.

As an improvement, the second acceleration detection unit is configured to detect acceleration in the in-plane X-axis direction, the second elastic member is an X-axis single-degree-of-freedom spring distributed along the in-plane Y-axis direction, and the second acceleration detection unit is fixed to the connection arm through the X-axis single-degree-of-freedom spring. The second acceleration detection unit includes a first weight and a first capacitor group; the first weight is provided with first mounting grooves distributed along the in-plane Y-axis direction at intervals, and each of the first mounting grooves is provided with the first capacitor group. The first capacitor group includes a first positive fixed electrode and a first negative fixed electrode, and the first positive fixed electrode and the first negative fixed electrode are distributed along the in-plane Y-axis direction; a side, away from the first negative fixed electrode, of the first positive fixed electrode and the first weight form a first differential detection capacitor; and a side, away from the first positive fixed electrode, of the first negative fixed electrode and the first weight form a second differential detection capacitor.

As an improvement, the second acceleration detection unit is configured to detect acceleration in the in-plane Y-axis direction, the second elastic member is a Y-axis single-degree-of-freedom spring distributed along the in-plane X-axis direction, and the second acceleration detection unit is fixed to the connection arm through the Y-axis single-degree-of-freedom spring. The second acceleration detection unit includes a second weight and a first capacitor group; the second weight is provided with second mounting grooves distributed along the in-plane X-axis direction at intervals, and each of the second mounting grooves is provided with the second capacitor group. The second capacitor group includes a second positive fixed electrode and a second negative fixed electrode, and the second positive fixed electrode and the second negative fixed electrode are distributed along the in-plane X-axis direction; a side, away from the second negative fixed electrode, of the second positive fixed electrode and the second weight form a third differential detection capacitor; and a side, away from the second positive fixed electrode, of the second negative fixed electrode and the second weight form a fourth differential detection capacitor.

As an improvement, the annular structure surrounds an outer side of the connection arm. The connection arm is provided with a receiving groove for mounting the second acceleration detection unit. The first anchor point is located at ta center of the connection arm.

As an improvement, two receiving grooves are symmetrically arranged.

As an improvement, one second acceleration detection unit is disposed in each of the receiving grooves; and one of the second acceleration detection units is configured to detect acceleration in the X-axis direction; and another one of the second acceleration detection units is configured to detect acceleration in the Y-axis direction.

Figure 1:
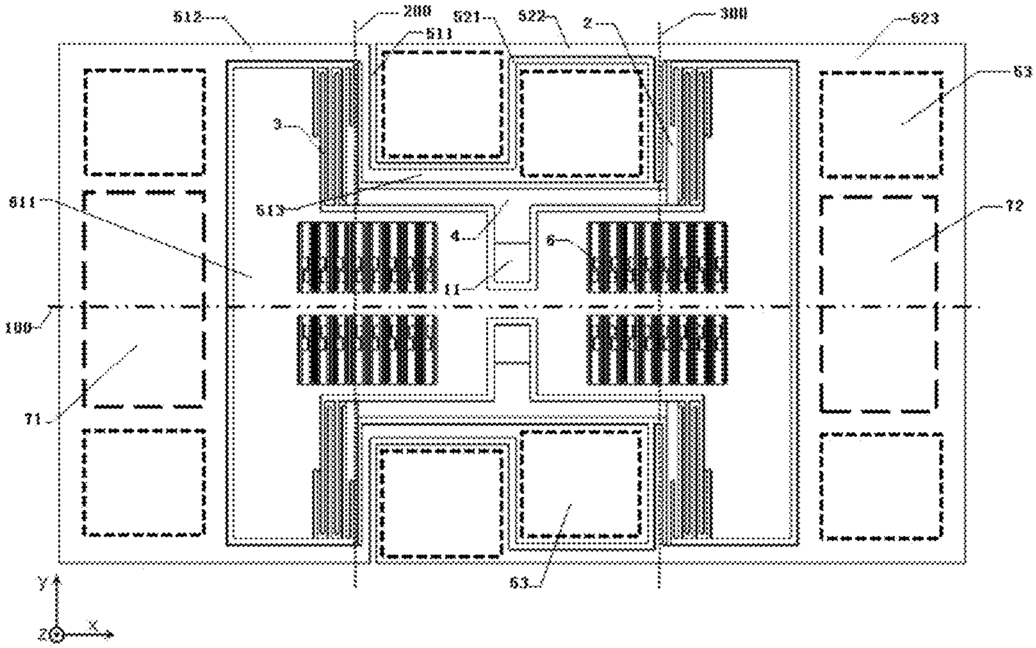
FIG. 1 is a structural schematic diagram of an acceleration sensor according to embodiment I of the present disclosure.

In the figures: 100: symmetry axis; 200: first rotation axis; 300: second rotation axis; 11: first anchor point; 12: second anchor point; 2: first elastic member; 3: second elastic member; 31: X-axis single-degree-of-freedom spring; 32: Y-axis single-degree-of-freedom spring; 4: connection arm; 41: receiving groove; 5: first acceleration detection unit; 51: first seesaw unit; 511: first groove; 512: first rotating sub-portion; 513: second rotating sub-portion; 52: second seesaw unit; 521: second groove; 522: third rotating sub-portion; 523: fourth rotating sub-portion; 53: out-of-plane displacement detection unit; 6: second acceleration detection unit; 611: first weight; 612: first mounting groove; 613: first positive fixed electrode; 614: first negative fixed electrode; 615: first fixed electrode; 616: first movable electrode; 621: second weight; 622: second mounting groove; 623: second positive fixed electrode; 624: second negative fixed electrode; 625: second fixed electrode; 626: second movable electrode; 71: first detection weight; 72: second detection weight; 8: coupling beam.

DESCRIPTION OF EMBODIMENTS

Various exemplary embodiments of the present disclosure are described in detail with reference to the drawings. It should be noted that: the relative arrangement of components and steps, numeric expressions and values described in the embodiments are not intended to limit the scope of the present disclosure, unless otherwise stated.

Embodiments of the present disclosure will be described in detail below, examples of which are shown in the accompanying drawings, same or similar numerals throughout indicate same or similar elements or elements with same or similar functions. Embodiments described below with reference to the accompanying drawings are illustrative and are only intended to explain the present disclosure shall not be interpreted as limitations on the present disclosure. All other embodiments obtained by those skilled in the art without paying creative labor shall fall into the protection scope of the present disclosure.

The feature defined by "first" and "second" in the specification and claims can indicate or imply to include one or more of the features. In the description of the present disclosure, unless otherwise indicated, "a plurality of" means two or more. In addition, "and/or" in the specification and claims indicates at least one of the associated objects, and the character "/" generally indicates that the associated objects are of an "or" relationship.

In the description of the present disclosure, it should be understood that the terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" and the like indicate an orientation or position relationship based on the orientation or position relationship shown in the drawings, and merely for convenience in describing the present disclosure and simplifying the description, and do not indicate or imply that the referred device or element must have a specific orientation, be constructed and operated in a specific orientation, and therefore cannot be understood as a limitation on the present disclosure.

In the description of the present disclosure, it should be noted that, unless otherwise specified and limited, the terms such as "mount", "connect" and "join" should be understood broadly, for example, it may be a fixed connection, a detachable connection, or an integral connection; it may be a mechanical connection, or an electrical connection; it may be a direct connection, or an indirect connection through an intermediate medium; or it may be an internal communication between two elements. For those of ordinary skill in the art, the specific meanings of the foregoing terms in the present disclosure can be understood on a case-by-case basis.

Embodiment I

Referring to FIGS. 1 to 5 and FIGS. 23 and 25, in an aspect, an embodiment of the present disclosure provides an acceleration sensor. In order to facilitate description of the acceleration sensor of the present disclosure, an X-Y-Z-axis three-dimensional coordinate system is established, referring to FIG. 1, an in-plane X-axis direction, an in-plane Y-axis direction and an out-of-plane Z-axis direction are defined, and the in-plane X-axis direction, the in-plane Y-axis direction and the out-of-plane Z-axis direction are perpendicular to each other.

In an example, the acceleration sensor includes a first acceleration detection unit 5, a second acceleration detection unit 6, a base, a connection arm 4, a first anchor point 11, a first elastic member 2, and a second elastic member 3. The first acceleration detection unit 5 is configured to detect acceleration in an out-of-plane Z-axis direction. The first acceleration detection unit 5 includes a first seesaw unit 51 and a second seesaw unit 52, and the first seesaw unit 51 is arranged opposite to the second seesaw unit 52 to define an annular structure. The second acceleration detection unit 6 is configured to detect acceleration in the in-plane X-axis direction and/or in the in-plane Y-axis direction.

In an example, the second acceleration detection unit 6 is configured to detect acceleration in the in-plane X-axis direction. In this case, the acceleration sensor may simultaneously detect acceleration in the in-plane X-axis direction and acceleration in the out-of-plane Z-axis direction, to form a biaxial (i.e., in-plane X-axis and out-of-plane Z-axis) accelerometer.

In another example, the second acceleration detection unit 6 is configured to detect acceleration in the in-plane Y-axis direction. In this case, the acceleration sensor may simultaneously detect acceleration in the in-plane Y-axis direction and acceleration in the out-of-plane Z-axis direction, to form a biaxial (i.e., in-plane Y-axis and out-of-plane Z-axis) accelerometer.

In another example, the second acceleration detection unit 6 may simultaneously detect acceleration in the in-plane X-axis direction and in the in-plane Y-axis direction. In this case, the acceleration sensor may simultaneously detect acceleration in the in-plane X-axis direction and in the in-plane Y-axis direction, and acceleration in the out-of-plane Z-axis direction, to form a triaxial (i.e., in-plane X-axis, in-plane Y-axis, and out-of-plane Z-axis) accelerometer.

In an example, the annular structure surrounds an outer side of the second acceleration detection unit 6. The first anchor point 11 is arranged at a middle portion of the base, and the connection arm 4 is fixed to the base through the first anchor point 11. The connection arm 4 is located between the first acceleration detection unit 5 and the second acceleration detection unit 6. The first acceleration detection unit 5 is connected to the connection arm 4 through the first elastic member 2. The second acceleration detection unit 6 is connected to the connection arm 4 through the second elastic member 3. The out-of-plane Z-axis direction, the in-plane X-axis direction, and the in-plane Y-axis direction are perpendicular to each other.

It should be noted that the first acceleration detection unit 5 is elastically connected to the connection arm 4, to provide flexible support for linear movement of the detection weight arranged at the first acceleration detection unit 5 in the in-plane X-axis direction and/or in the in-plane Y-axis direction, and to enable movement of the first acceleration detection unit 5 in the out-of-plane Z-axis direction to be co-coupled. Meanwhile, the second acceleration detection unit 6 is elastically connected to the connection arm 4, to provide flexible support for linear movement of the detection weight arranged at the second acceleration detection unit 6 in the in-plane X-axis direction and/or in the in-plane Y-axis direction, and to enable movement of the first acceleration detection unit 5 in the out-of-plane Z-axis direction to be co-coupled.

In an example, the first anchor point 11 is disposed at a center of the structure of the acceleration sensor, and the first acceleration detection and the second acceleration detection share the first anchor point 11 through the connection arm 4, so that the overall structure of the acceleration sensor is less affected by factors such as stress, and the anti-interference capability of the acceleration sensor is remarkably improved.

For example, the acceleration sensor is symmetrically distributed about a symmetry axis 100 thereof, and each of the first seesaw unit 51 and the second seesaw unit 52 is symmetrically distributed about the symmetry axis 100.

In an example, the first acceleration detection unit 5 further includes an out-of-plane displacement detection unit 53.

A middle part of a side of the connection arm 4 close to the second acceleration detection unit 6 is fixed to the first anchor point 11.

The first seesaw unit 51 is elastically connected to a first end of the connection arm 4, the second seesaw unit 52 is elastically connected to a second end of the connection arm 4. Each of the first seesaw unit 51 and the second seesaw unit 52 is symmetrically distributed about a symmetry axis 100 of the acceleration sensor. The first seesaw unit 51 includes two first seesaw structures arranged at two sides of the symmetry axis 100, and each of the two first seesaw structures both rotates about a first rotation axis 200. The second seesaw unit 52 includes two second seesaw structures arranged at two sides of the symmetry axis 100, and each of the two second seesaw structures rotates about a second rotation axis 300. Herein, the first rotation axis 200 and the second rotation axis 300 are arranged in parallel, and the first rotation axis 200 and the second rotation axis 300 are perpendicular to the symmetry axis 100.

The first seesaw unit 51 and the second seesaw unit 52 each are provided with the out-of-plane displacement detection unit 53.

In this embodiment, the first seesaw unit 51 and the second seesaw unit 52 are used as the detection structure for detecting the out-of-plane acceleration, so that the first seesaw unit 51 and the second seesaw unit 52 may rotate reversely about the Y-axis direction under an action of acceleration in the out-of-plane Z-axis direction. That is, the out-of-plane acceleration (i.e., the Z-axis acceleration) of the acceleration sensor may be detected by the out-of-plane displacement detection unit 53 arranged at the first seesaw unit 51 and the second seesaw unit 52. Meanwhile, when the two first seesaw structures or the two second seesaw structures are subjected to undesired Y-axis angular acceleration, the two first seesaw structures or the two second seesaw structures rotate towards a same direction, and the capacitance change of the out-of-plane displacement detection unit 53 caused by the rotation towards a same direction is offset when the out-of-plane displacement detection unit 53 detects. Therefore, the layout of the two first seesaw structures and the two second seesaw structures greatly reduces an influence of the Y-axis angular acceleration on the acceleration sensor, improves the cross inhibition ratio of the acceleration sensor, and improves the accuracy of detection of the out-of-plane acceleration by the acceleration sensor.

In an example, a first groove 511 is provided at an outer side of the first seesaw unit 51, a second groove 521 is provided at an inner side of the second seesaw unit 52. A part of the first seesaw unit 51 is embedded into the second groove 521, and a part of the second seesaw unit 52 is embedded into the first groove 511, to form an embedded structure. The embedded structure is located between the first rotation axis 200 and the second rotation axis 300.

In this embodiment, an embedded structure is adopted between the first seesaw unit 51 and the second seesaw unit 52. The embedded structure helps to extend the rotating arms of the first seesaw unit 51 and the second seesaw unit 52. Meanwhile, the out-of-plane displacement detection unit 53 may be arranged at a region farther from the rotation axis, so that a gain of out-of-plane acceleration detection is greater.

In an example, the acceleration sensor further includes a first detection weight 71 and a second detection weight 72.

Each first seesaw structure includes a first rotating sub-portion 512 and a second rotating sub-portion 513, the first rotating sub-portion 512 and the second rotating sub-portion 513 are respectively located at two opposite sides of the first rotation axis 200, and a first groove 511 is formed at an outer side of the second rotating sub-portion 513. Each second seesaw structure includes a third rotating sub-portion 522 and a fourth rotating sub-portion 523, the third rotating sub-portion 522 and the fourth rotating sub-portion 523 are respectively located at two opposite sides of the second rotation axis 300, and a second groove 521 is formed at an inner side of the third rotating sub-portion 522.

The first detection weight 71 is arranged at the first rotating sub-portion 512, the second detection weight 72 is arranged at the fourth rotating sub-portion 523, and the first detection weight 71 and the second detection weight 72 are symmetrically arranged.

In this embodiment, the first detection weight 71 and the second detection weight 72 form asymmetric detection mass, and the asymmetric detection mass is located at a distal end of the seesaw structure, so that rotation of the first seesaw structure and the second seesaw structure caused by out-of-plane acceleration is more sensitive, thereby improving the gain of detection of the acceleration sensor.

In an example, a position where the two first rotating sub-portions 512 are connected is provided with first detection mass, and a position where the two fourth rotating sub-portions 523 are connected is provided with second detection mass, thereby helping to further increase a distance between the detection mass and the rotation axis, and thus significantly making rotation of the first seesaw structure and the second seesaw structure caused by the out-of-plane acceleration more sensitive, and further improving the gain of detection of the acceleration sensor.

In an example, the acceleration sensor further includes a coupling beam 8, and the coupling beam 8 extends in a direction perpendicular to the symmetry axis 100. An end of the coupling beam 8 is connected to the second rotating sub-portion 513, and another end of the coupling beam 8 is connected to the third rotating sub-portion 522.

In this embodiment, by providing the coupling beam 8 between the first seesaw unit 51 and the second seesaw unit 52, the coupling beam 8 can weaken rotation of the first seesaw unit 51 and the second seesaw unit 52 towards a same direction, thereby further inhibiting an influence of the y-axis angular acceleration, and thus further improving the accuracy of detection of the out-of-plane acceleration by the acceleration sensor.

In an example, each of the first rotating sub-portion 512, the second rotating sub-portion 513, the third rotating sub-portion 522 and the fourth rotating sub-portion 523 is provided with an out-of-plane displacement detection unit 53. A part of the out-of-plane displacement detection unit 53 is located at a position of the first seesaw unit 51 away from the first rotation axis 200, and a part of the out-of-plane displacement detection unit 53 is located at a position of the second seesaw unit 52 away from the second rotation axis 300. A plurality of out-of-plane displacement detection units 53 are symmetrically distributed about the symmetry axis 100.

For example, the coupling beam 8 has a strip shape, an end of the coupling beam 8 is fixed to a bottom wall of the first groove 511, and another end of the coupling beam 8 is fixed to a bottom wall of the second groove 521. Such a design makes a structure of the coupling beam 8 simple, and facilitates the assembly of the acceleration sensor.

In some implementations, the coupling beam 8 includes two parallel sub-beams. An end of the sub-beam is fixed to the bottom wall of the first groove 511, and another end of the sub-beam is fixed to the bottom wall of the second groove 521. Such a design further improves the capability of the coupling beam 8 to weaken rotation of the first seesaw unit 51 and the second seesaw unit 52 towards a same direction, thereby further inhibiting an influence of the y-axis angular acceleration.

In some other implementations, the coupling beam 8 has a rectangular shape. A middle part of a side of the coupling beam 8 is fixed to an inner side wall of the first groove 511, and a middle part of another side of the coupling beam 8 is fixed to an inner side wall of the second groove 521. Such a design makes a structural design of the coupling beam 8 reasonable, and can effectively weaken rotation of the first seesaw unit 51 and the second seesaw unit 52 towards a same direction.

In an example, the two connection arms 4 are symmetrically distributed about the symmetry axis 100. Each of the two connection arms 4 is fixed to the base through a respective first anchor point 11. The two first anchor points 11 are located between the two connection arms 4.

Figure 23:
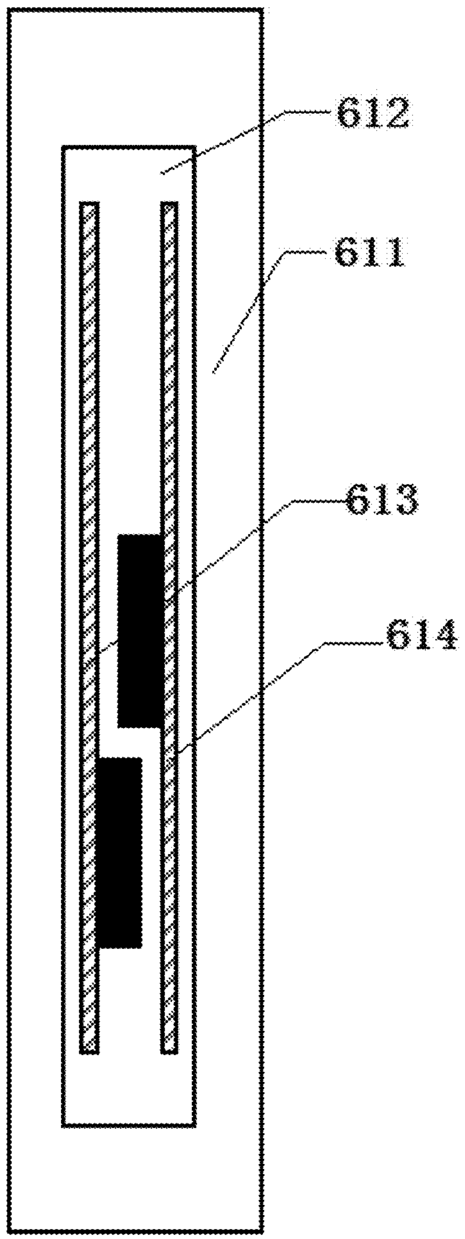
FIG. 23 is a structural schematic diagram of a first capacitor group of an acceleration sensor according to a first implementation of an embodiment of the present disclosure.

In an example, referring to FIG. 1 and FIG. 23, the second acceleration detection unit 6 is configured to detect acceleration in the in-plane X-axis direction, the second elastic member 3 is an X-axis single-degree-of-freedom spring 31 distributed along the in-plane Y-axis direction, and the second acceleration detection unit 6 is fixed to the connection arm 4 through the X-axis single-degree-of-freedom spring 31.

The second acceleration detection unit 6 includes a first weight 611 and a first capacitor group. The first weight 611 is provided with first mounting grooves 612 distributed along the in-plane Y-axis direction at intervals, and each of the first mounting grooves 612 is provided with the first capacitor group.

The first capacitor group includes a first positive fixed electrode 613 and a first negative fixed electrode 614, and the first positive fixed electrode 613 and the first negative fixed electrode 614 are distributed along the in-plane Y-axis direction. A side, away from the first negative fixed electrode 614, of the first positive fixed electrode 613 and the first weight 611 form a first differential detection capacitor; and a side, away from the first positive fixed electrode 613, of the first negative fixed electrode 614 and the first weight 611 form a second differential detection capacitor.

Referring to FIG. 23, when the first weight 611 is displaced to the left under an action of the left acceleration in the X axis, a capacitance spacing of the first differential detection capacitor decreases, a capacitance spacing of the second differential detection capacitor increases, and the first differential detection capacitor and the second differential detection capacitor have a capacitance difference change proportional to the left acceleration in the X axis. A real-time value of the left acceleration in the X axis can be obtained by detecting the change of the capacitance difference.

Similarly, when the first weight 611 is displaced to the right under an action of the right acceleration in the X-axis, a real-time value of the right acceleration in the X-axis can also be obtained by detecting the change of the capacitance difference.

In this embodiment, the second acceleration detection unit 6 has a reasonable structural design, which can accurately detect the in-plane X-axis acceleration.

Figure 15:
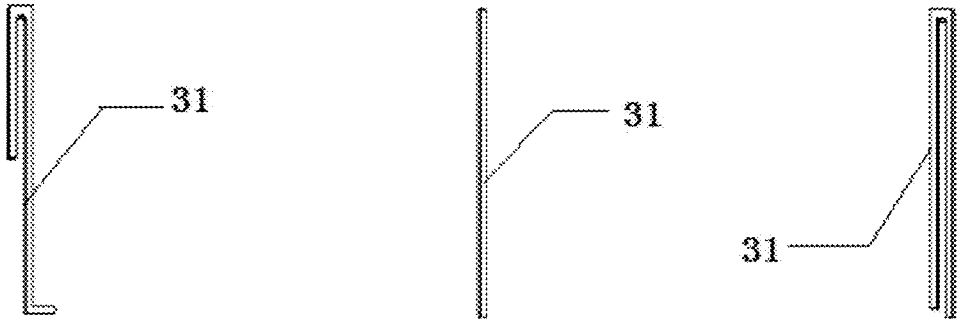
FIG. 15 is a structural schematic diagram of a X-axis single-degree-of-freedom spring of an acceleration sensor according to an embodiment of the present disclosure.

For example, referring to FIG. 15, the X-axis single-degree-of-freedom spring 31 may be designed to have different shapes according to a specific structure of the acceleration sensor, so as to better detect the in-plane X-axis acceleration.

In this embodiment, the out-of-plane displacement detection unit 53 includes a first out-of-plane detection plate and a second out-of-plane detection plate, and the first out-of-plane detection plate and the second out-of-plane detection plate are arranged opposite to each other to form a capacitor plate structure. The first out-of-plane detection plate is arranged at the base or a cavity cover, and the second out-of-plane detection plate is arranged at the first seesaw unit 51 and the second seesaw unit 52.

Embodiment II

An embodiment of the present disclosure provides another acceleration sensor, a structure of which is basically the same as that of embodiment I, and only the different parts are described below.

Referring to FIG. 6 to FIG. 9 and FIG. 24, FIG. 26, the second acceleration detection unit 6 is configured to detect acceleration in an in-plane X-axis direction.

Figure 24:
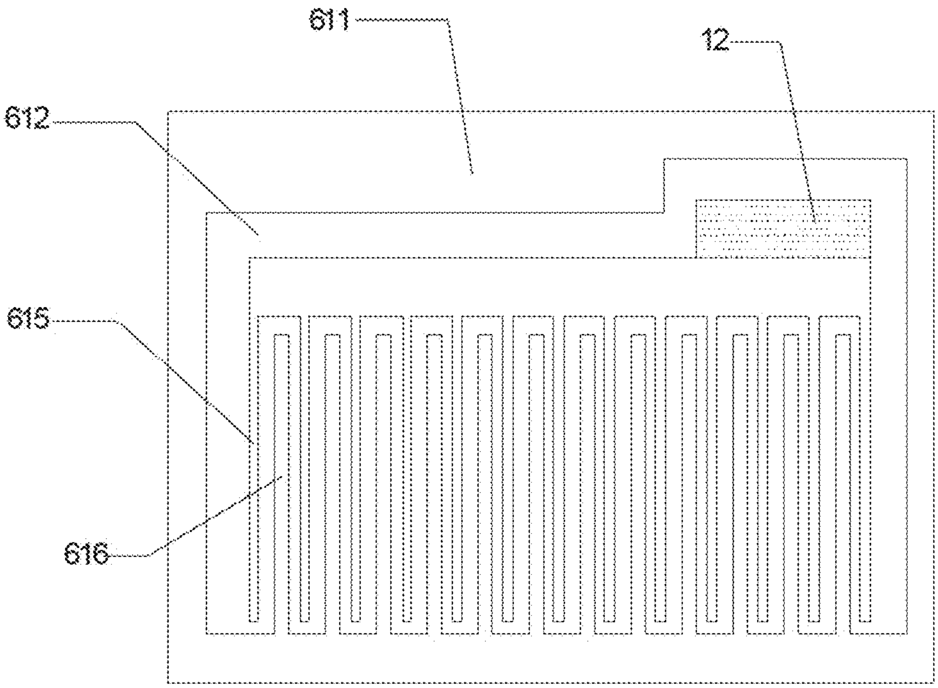
FIG. 24 is a structural schematic diagram of a first capacitor group of an acceleration sensor according to a second implementation of an embodiment of the present disclosure.

Referring to FIG. 24, the second acceleration detection unit 6 includes a first weight 611 and a first capacitor group. The first weight 611 is provided with first mounting grooves 612 symmetrically arranged, and each of the first mounting grooves 612 is provided with the first capacitor group.

The first capacitor group includes a first fixed electrode 615 and a first movable electrode 616. A plurality of first fixed electrodes 615 and a plurality of first movable electrodes 616 are all distributed along the in-plane Y-axis direction. A plurality of first movable electrodes 616 are disposed at intervals. A plurality of first movable electrodes 616 are connected to the first weight 611. A plurality of first fixed electrodes 615 are disposed at intervals. A plurality of first fixed electrodes 615 are fixed to the base through the second anchor point 12. A first movable electrode 616 is disposed between two first fixed electrodes 615 that are connected to each other. The first fixed electrode 615 and one first movable electrode 616 form a first differential detection capacitor, and the first fixed electrode 615 and another first movable electrode 616 form a second differential detection capacitor.

When the first weight 611 is displaced to the left under an action of the in-plane left acceleration in the X axis, a capacitance spacing of the first differential detection capacitor decreases, a capacitance spacing of the second differential detection capacitor increases, and the first differential detection capacitor and the second differential detection capacitor have a capacitance difference change proportional to the in-plane left acceleration in the X axis. A real-time value of the left acceleration in the in-plane X axis may be obtained by detecting the change of the capacitance difference.

Similarly, when the first weight 611 is displaced to the right under an action of the in-plane right acceleration in the X-axis, a real-time value of the right acceleration in the in-plane X-axis may also be obtained by detecting the change of the capacitance difference.

For example, a plurality of first capacitor groups are provided, and the first fixed electrodes 615 of each first capacitor group are fixed to the base through the second anchor point 12. A plurality of second anchor points 12 are close to the first anchor point 11. The anchor point of the fixed electrode for detection in the in-plane X-axis is also placed close to the first anchor point 11 of the moving structure, thereby helping to make all the detection electrodes and the anchor point of the moving structure located at a center of the structure, and thus further improving the anti-interference capability such as stress resistance of the acceleration sensor.

Embodiment III

An embodiment provides another acceleration sensor, a structure of which is basically the same as that of embodiment I, and only the different parts are described below.

Referring to FIG. 10 to FIG. 14, and FIG. 25, the second acceleration detection unit 6 is configured to detect acceleration in the in-plane Y-axis direction, the second elastic member 3 is an Y-axis single-degree-of-freedom spring 32 distributed along the in-plane X-axis direction, and the second acceleration detection unit 6 is fixed to the connection arm 4 through the Y-axis single-degree-of-freedom spring 32.

The second acceleration detection unit 6 includes a second weight 621 and a first capacitor group. The second weight 621 is provided with second mounting grooves 622 distributed along the in-plane X-axis direction at intervals, and each of the second mounting grooves 622 is provided with the second capacitor group.

The second capacitor group includes a second positive fixed electrode 623 and a second negative fixed electrode 624, and the second positive fixed electrode 623 and the second negative fixed electrode 624 are distributed along the in-plane X-axis direction. A side, away from the second negative fixed electrode 624, of the second positive fixed electrode 623 and the second weight 621 form a third differential detection capacitor. A side, away from the second positive fixed electrode 623, of the second negative fixed electrode 624 and the second weight 621 form a fourth differential detection capacitor.

Figure 25:
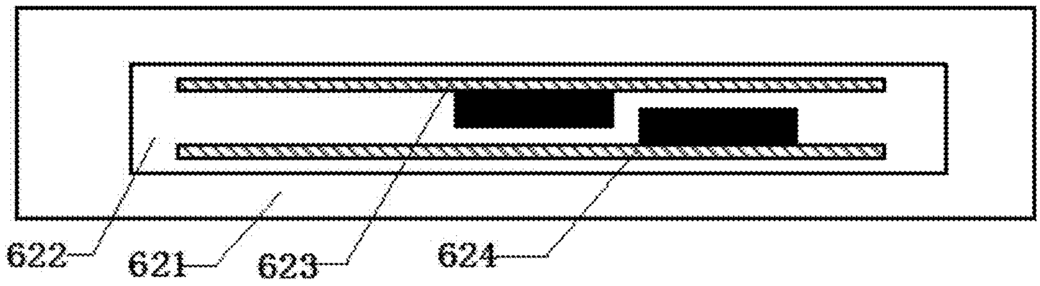
FIG. 25 is a structural schematic diagram of a second capacitor group of an acceleration sensor according to a first implementation of an embodiment of the present disclosure.

Referring to FIG. 25, when the second weight 621 is displaced upward under an action of the upward acceleration in the Y-axis, a capacitance spacing of the third differential detection capacitor decreases, a capacitance spacing of the fourth differential detection capacitor increases, and the third differential detection capacitor and the fourth differential detection capacitor have a capacitance difference change proportional to the acceleration in the Y-axis direction. A real-time value of the upward acceleration in the Y-axis may be obtained by detecting the change of the capacitance difference.

Similarly, when the second weight 621 is displaced downward under an action of the downward acceleration in the Y-axis, a real-time value of the downward acceleration in the Y-axis may also be obtained by detecting the change of the capacitance difference.

In this embodiments, the second acceleration detection unit 6 has a reasonable structural design, and can accurately detect the in-plane Y-axis acceleration.

Figure 16:
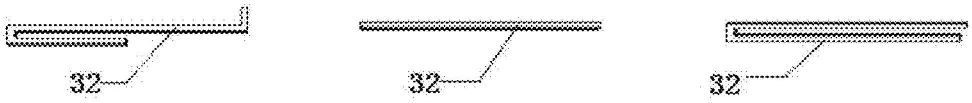
FIG. 16 is a structural schematic diagram of a Y-axis single-degree-of-freedom spring of an acceleration sensor according to an embodiment of the present disclosure.
Figure 17:
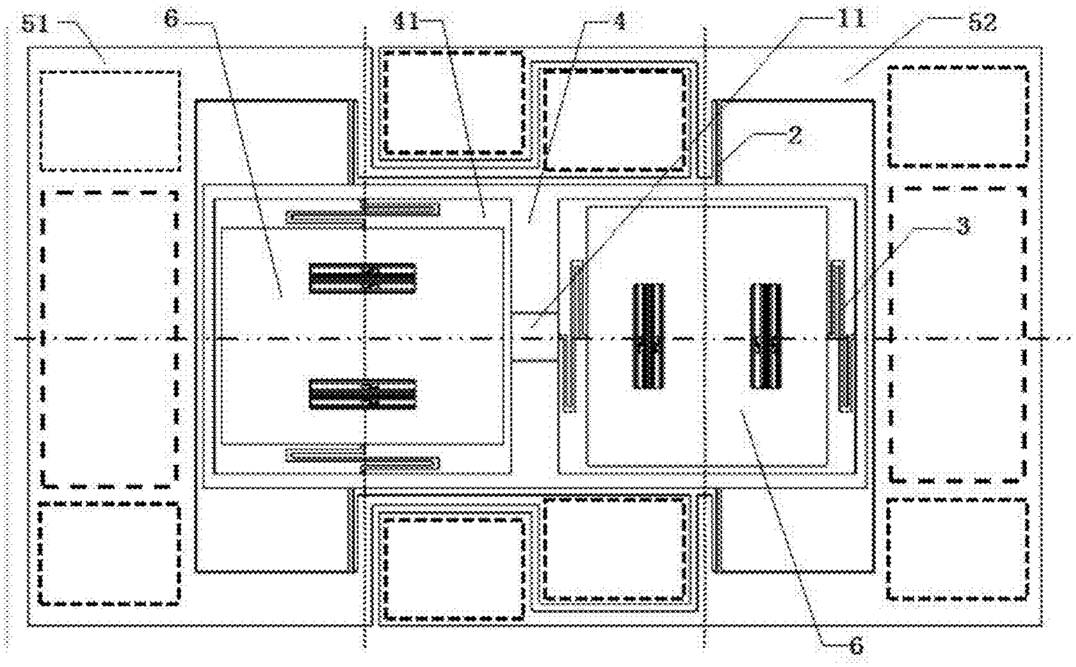
FIG. 17 is a structural schematic diagram of an acceleration sensor according to embodiment IV of the present disclosure.

For example, referring to FIG. 16, the Y-axis single-degree-of-freedom spring 32 may be designed into different shapes according to a specific structure of the acceleration sensor, so as to better detect the acceleration in the Y-axis by the acceleration sensor.

Figure 26:
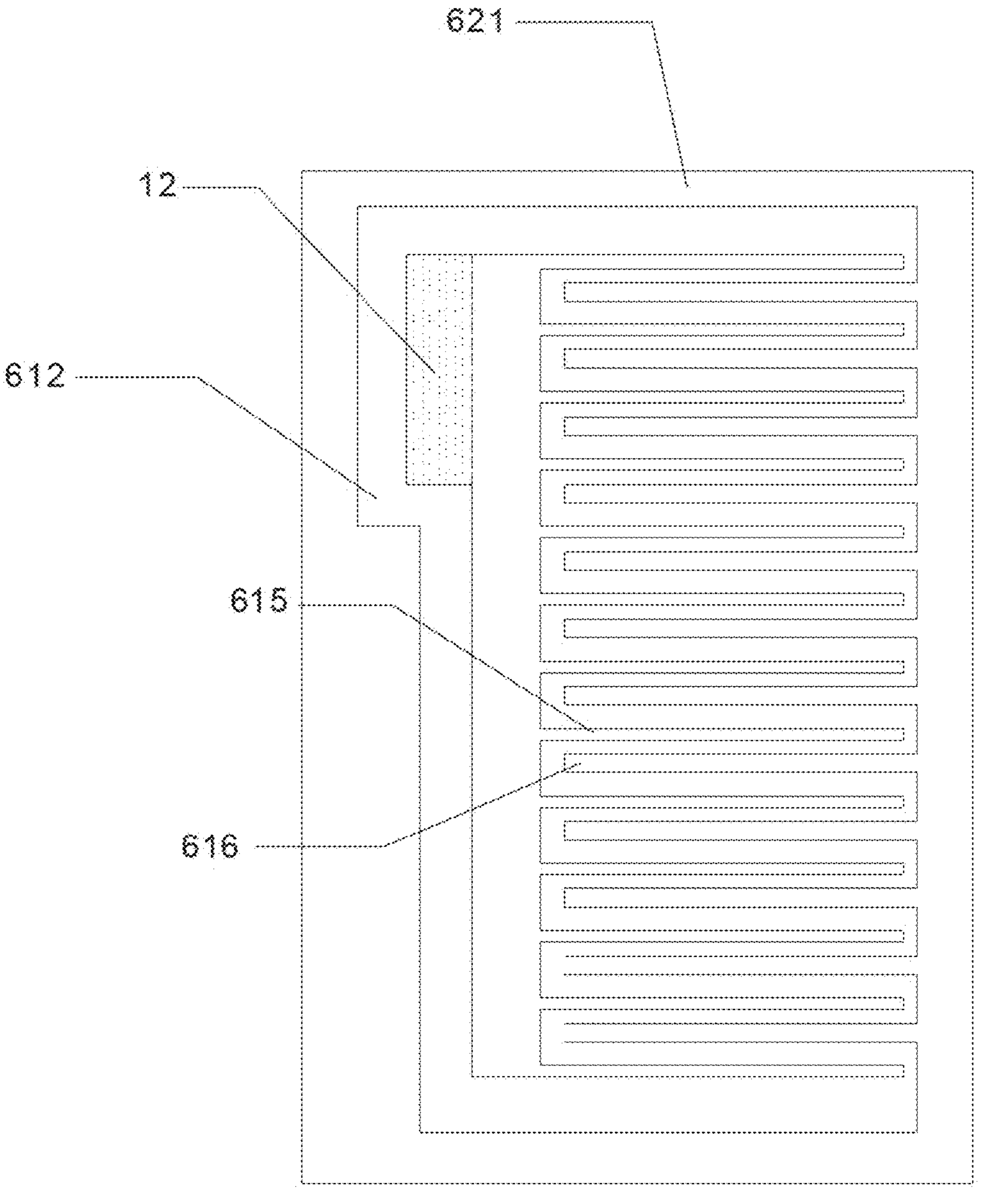
FIG. 26 is a structural schematic diagram of a second capacitor group of an acceleration sensor according to a second implementation of an embodiment of the present disclosure.

Referring to FIG. 26, in an example, the second acceleration detection unit 6 includes second mass 621 and a second capacitor group. The second weight 621 is symmetrically provided with second mounting grooves 622, and each of the second mounting grooves 622 is provided with a second capacitor group therein.

The second capacitor group includes a second fixed electrode 625 and a second movable electrode 626. A plurality of second fixed electrodes 625 and a plurality of second movable electrodes 626 are distributed along the in-plane X-axis direction. A plurality of second movable electrodes 626 are disposed at intervals. A plurality of second movable electrodes 626 are connected to the second weight 621. A plurality of second fixed electrodes 625 are disposed at intervals. A plurality of second fixed electrodes 625 are fixed to the base through the second anchor point 12. A second movable electrode 626 is disposed between two second fixed electrodes 625 that are connected to each other. The second fixed electrode 625 and one second movable electrode 626 form a third differential detection capacitor, and the second fixed electrode 625 and another second movable electrode 626 form a fourth differential detection capacitor.

When the second weight 621 is displaced upward under an action of the upward acceleration in the Y-axis, a capacitance spacing of the third differential detection capacitor decreases, a capacitance spacing of the fourth differential detection capacitor increases, and the third differential detection capacitor and the fourth differential detection capacitor have a capacitance difference change proportional to the acceleration in the Y-axis. A real-time value of the upward acceleration in the Y-axis can be obtained by detecting the change of the capacitance difference.

Similarly, when the second weight 621 is displaced downward under an action of the downward acceleration in the Y-axis, a real-time value of the downward acceleration in the Y-axis can be obtained by detecting the change of the capacitance difference.

For example, a plurality of second capacitor groups are provided. A second fixed electrodes 625 of each second capacitor group are fixed to the base through the second anchor point 12. A plurality of second anchor points 12 are close to the first anchor point 11. The anchor point of the fixed electrode for detection in the in-plane Y-axis is also placed close to the first anchor point 11 of the moving structure, thereby helping to make all the detection electrodes and the anchor point of the moving structure located at a center of the structure, and thus further improving the anti-interference capability such as stress resistance of the acceleration sensor.

Embodiment IV

An embodiment of the present disclosure provides another acceleration sensor, a structure of which is basically the same as that of embodiment I, and only the different parts are described below.

Referring to FIG. 17 to FIG. 22, the annular structure surrounds an outer side of the connection arm 4. The connection arm 4 is provided with a receiving groove 41 for mounting the second acceleration detection unit 6, and the first anchor point 11 is located at a center of the connection arm 4.

In this embodiment, the structural design of the connection arm 4 is reasonable, and it is also convenient to quickly install the second acceleration detection unit 6 in the receiving groove 41, thereby helping to accurately detect the acceleration in the in-plane X-axis direction and/or in the in-plane Y-axis direction.

In an example, two receiving grooves 41 are symmetrically arranged. Such a design facilitates accurate detection of acceleration in the in-plane X-axis direction and/or in the in-plane Y-axis direction.

For example, the receiving groove 41 may have a rectangular shape or a polygonal shape.

In an example, each receiving groove 41 is provided with one second acceleration detection unit 6.

A second acceleration detection unit 6 is configured to detect acceleration in the X-axis direction, and another second acceleration detection unit 6 is configured to detect acceleration in the Y-axis direction.

In this embodiment, the acceleration sensor can simultaneously detect the acceleration in the in-plane X-axis direction, the acceleration in the in-plane Y-axis direction and the acceleration in the in-plane Z-axis direction, to form a three-axis accelerometer, which expands a detection range of the acceleration sensor and is very convenient to use.

In this embodiment of the present disclosure, detection masses of three axes of the acceleration sensor share a same first anchor point 11, and the detection masses of the three axes are separately distributed by using frames distributed by detection masses in the in-plane X-axis, in the in-plane Y-axis, and in the out-of-plane Z-axis, to avoid cross interference between axes.

For example, the second acceleration detection unit 6 for detecting the in-plane X-axis acceleration and the second acceleration detection unit 6 for detecting the in-plane Y-axis acceleration are respectively located at two opposite sides of the anchor point, thereby optimizing the structure of the acceleration sensor.

Figure 2:
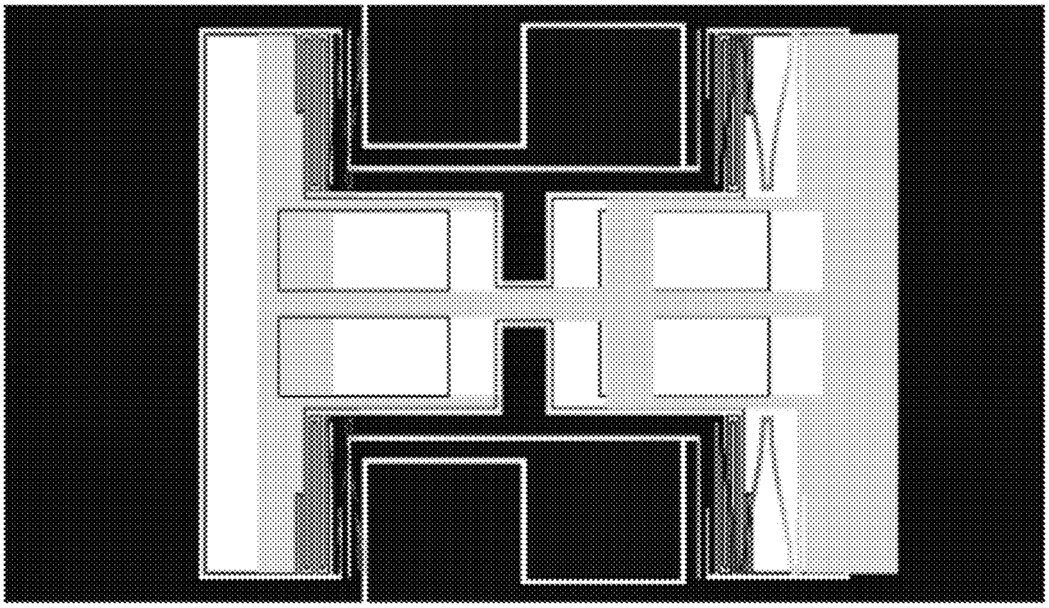
FIG. 2 is a schematic diagram of an in-plane X-axis detection mode of an acceleration sensor according to embodiment I of the present disclosure.
Figure 3:
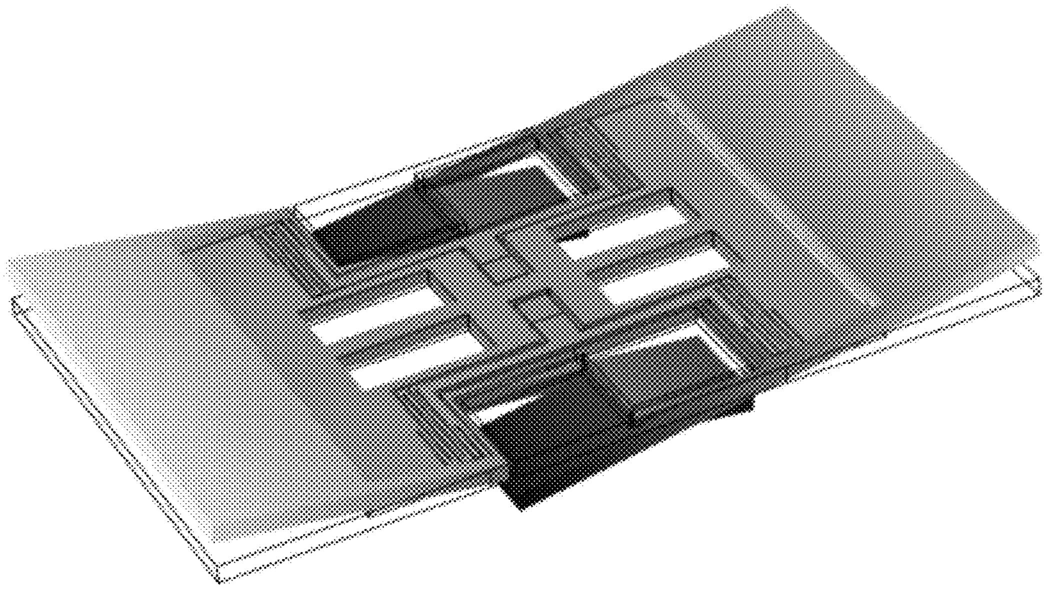
FIG. 3 is a schematic diagram of an out-of-plane Z-axis detection mode of an acceleration sensor according to embodiment I of the present disclosure.
Figure 4:
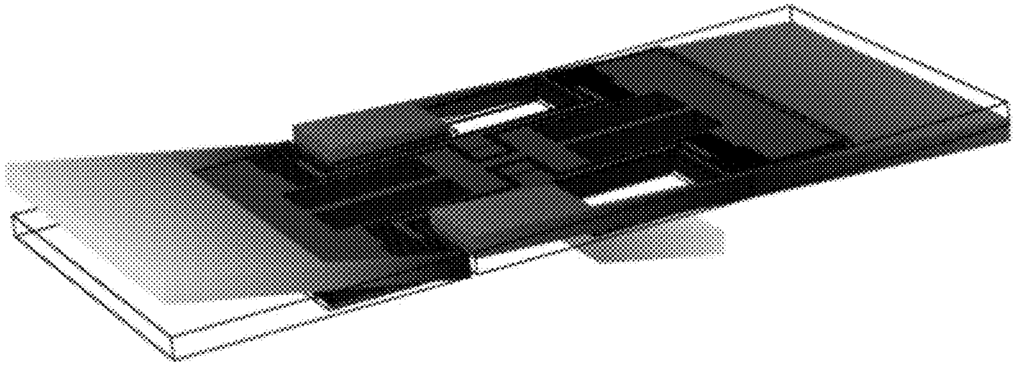
FIG. 4 is a schematic diagram of an out-of-plane Z-axis parasitic mode of an acceleration sensor according to embodiment I of the present disclosure.
Figure 5:
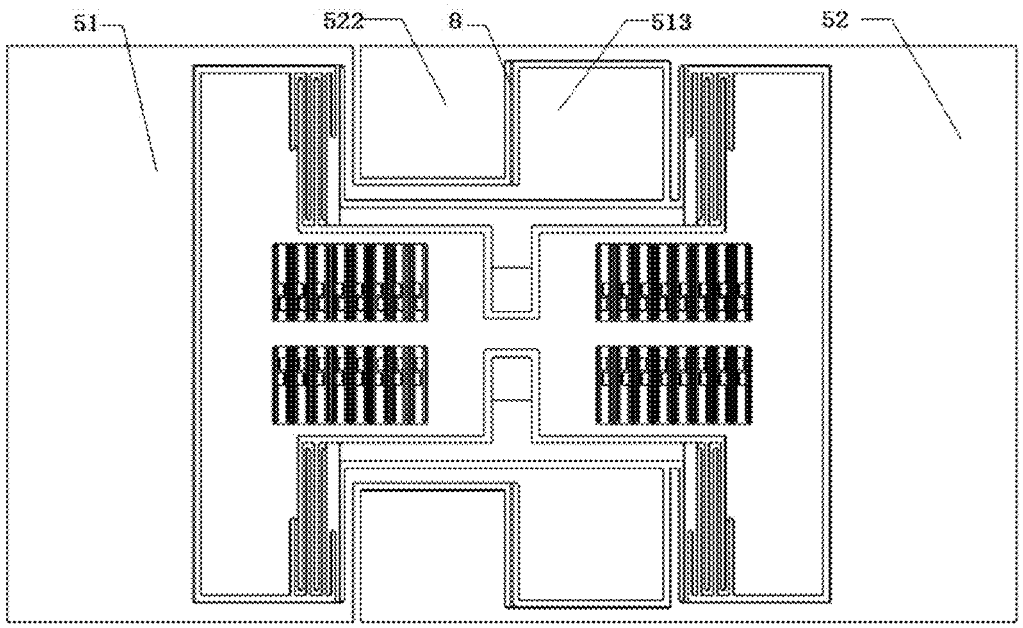
FIG. 5 is a structural schematic diagram of a coupling beam of an acceleration sensor according to embodiment I of the present disclosure.
Figure 6:
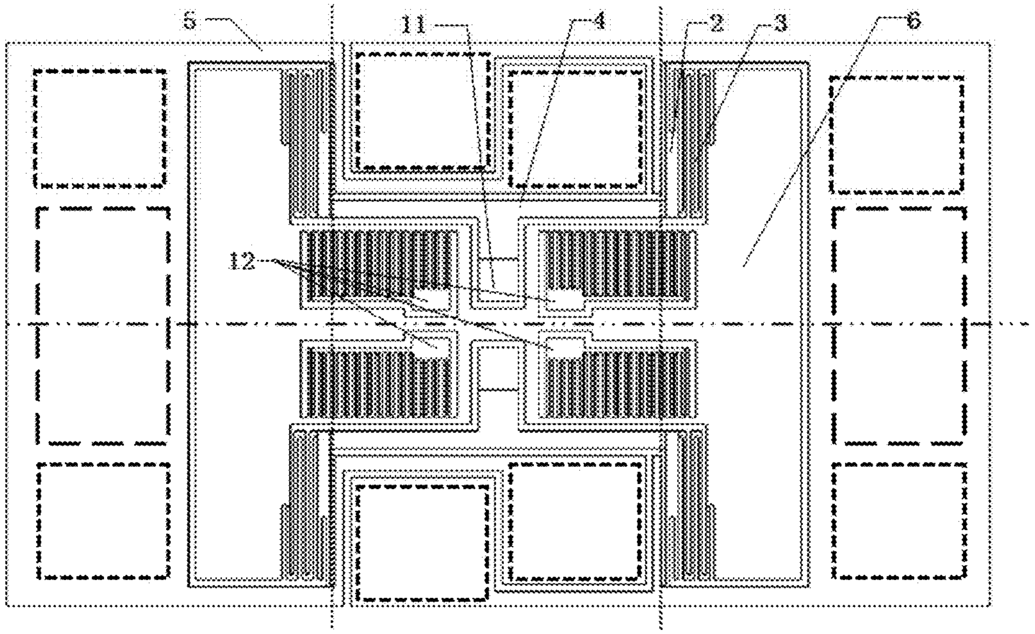
FIG. 6 is a structural schematic diagram of an acceleration sensor according to embodiment II of the present disclosure.
Figure 7:
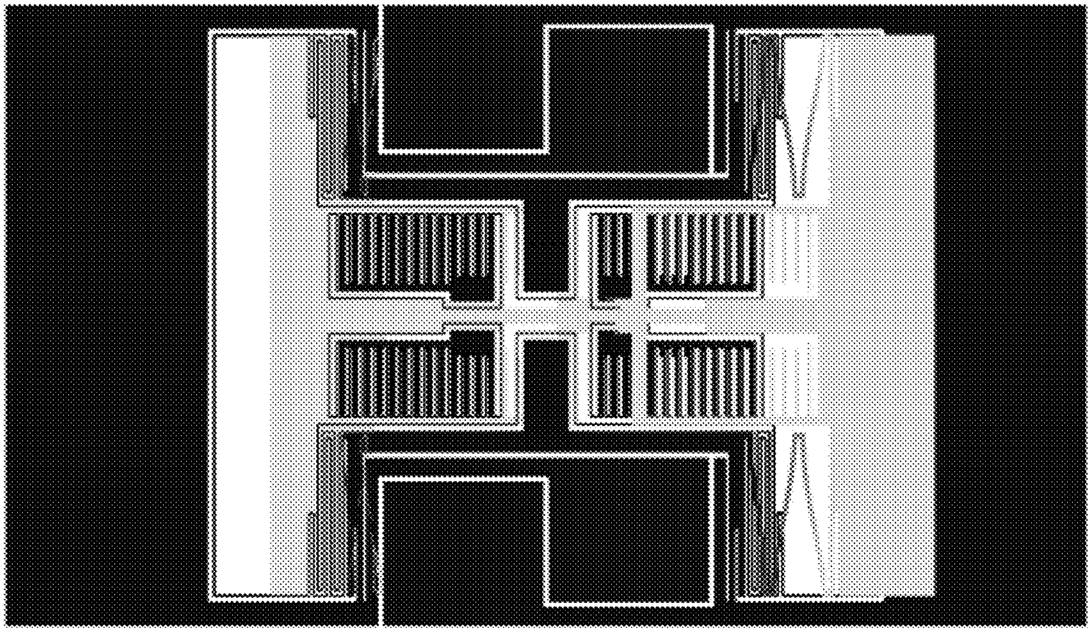
FIG. 7 is a schematic diagram of an in-plane X-axis detection mode of an acceleration sensor according to embodiment II of the present disclosure.
Figure 8:
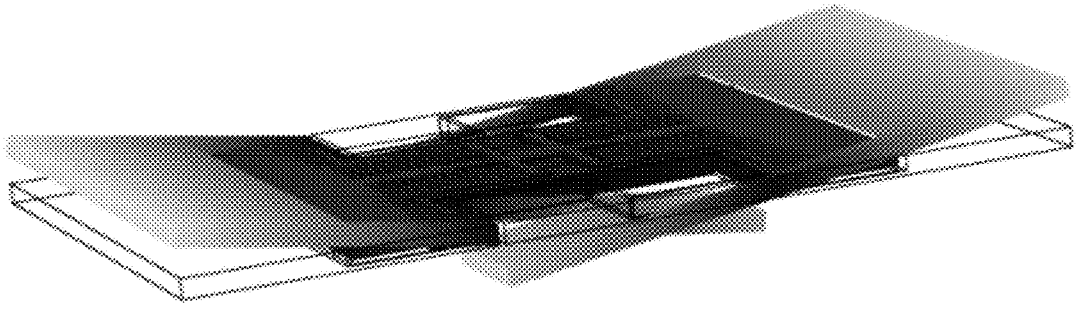
FIG. 8 is a schematic diagram of an out-of-plane Z-axis detection mode of an acceleration sensor according to embodiment II of the present disclosure.
Figure 9:
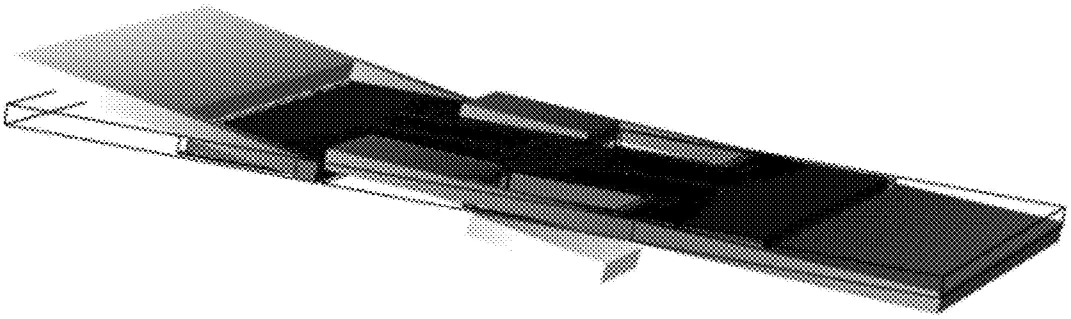
FIG. 9 is a schematic diagram of an out-of-plane Z-axis parasitic mode of an acceleration sensor according to embodiment II of the present disclosure.
Figure 10:
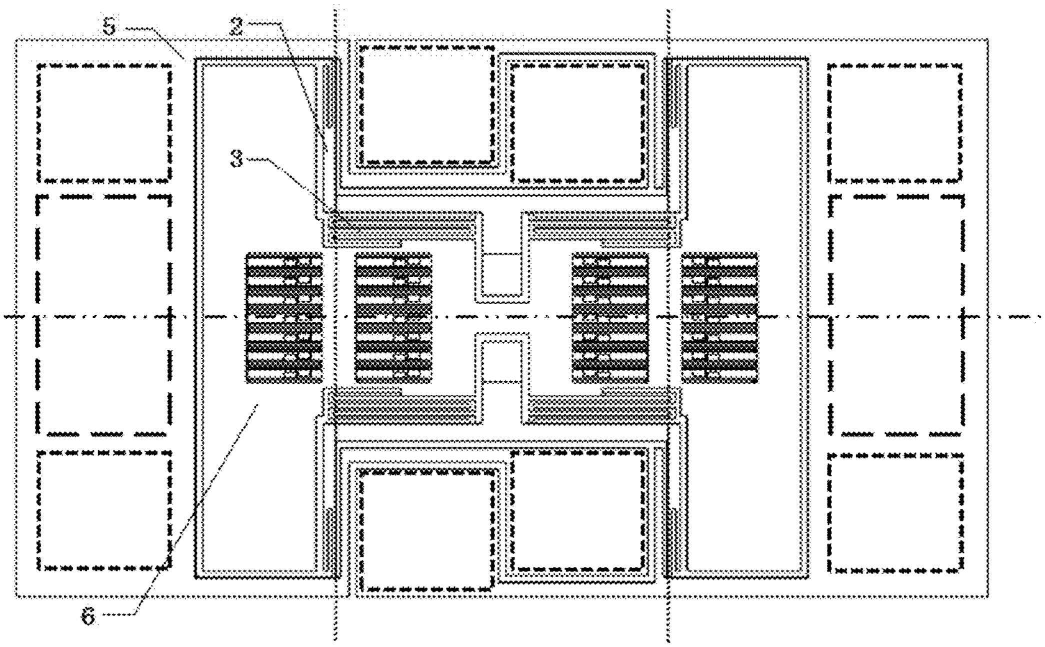
FIG. 10 is a structural schematic diagram of an acceleration sensor according to embodiment III of the present disclosure.
Figure 11:
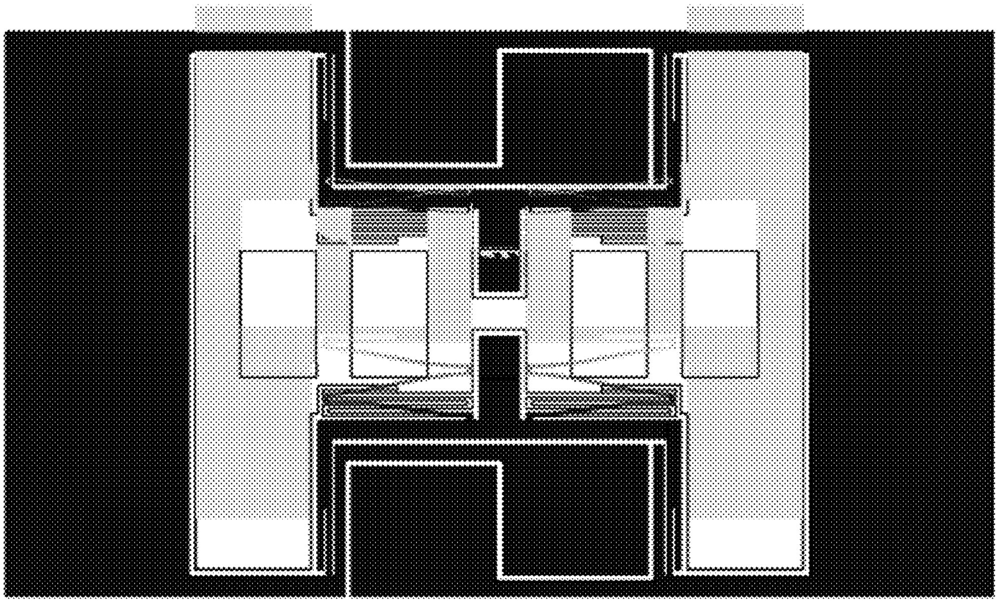
FIG. 11 is a schematic diagram of an in-plane Y-axis detection mode of an acceleration sensor according to embodiment III of the present disclosure.
Figure 12:
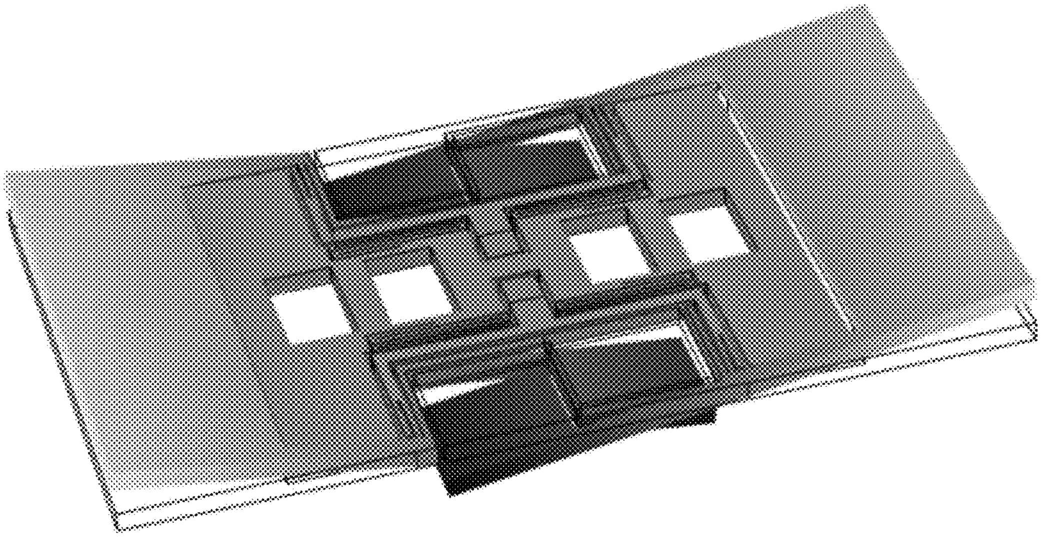
FIG. 12 is a schematic diagram of an out-of-plane Z-axis detection mode of an acceleration sensor according to embodiment III of the present disclosure.
Figure 13:
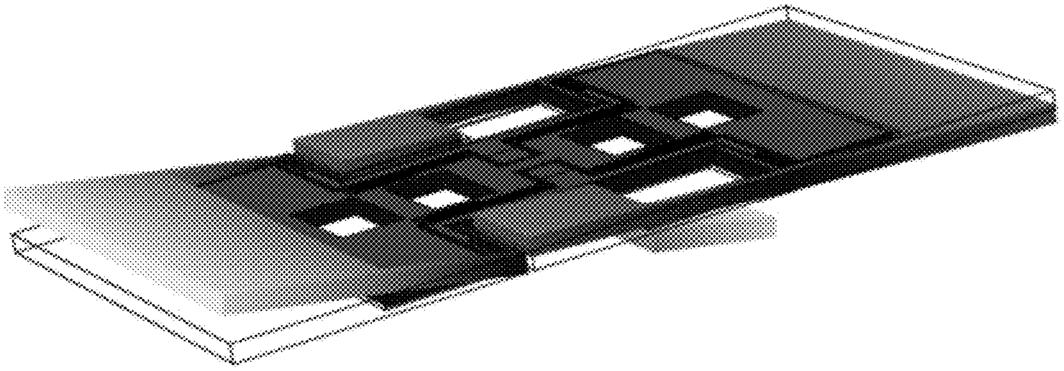
FIG. 13 is a schematic diagram of an out-of-plane Z-axis parasitic mode of an acceleration sensor according to embodiment III of the present disclosure.
Figure 14:
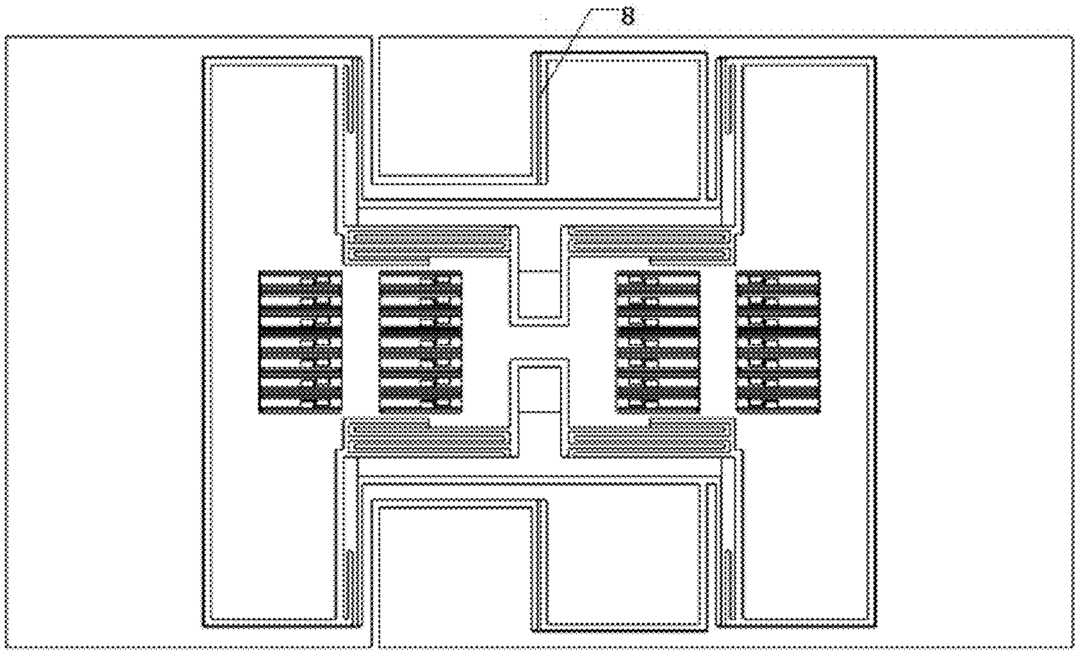
FIG. 14 is a structural schematic diagram of a coupling beam of an acceleration sensor according to embodiment III of the present disclosure.
Figure 18:
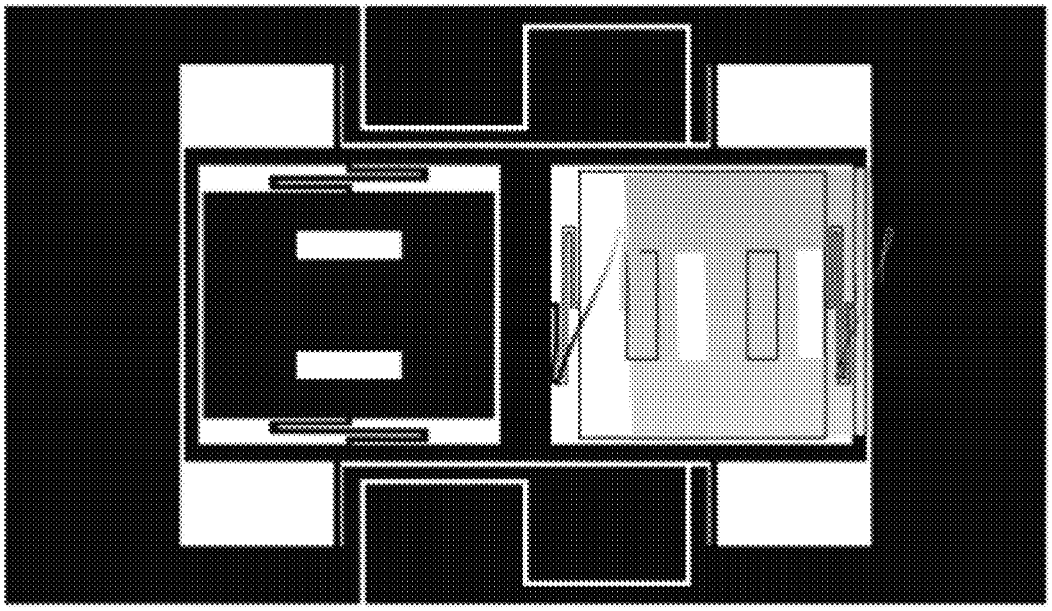
FIG. 18 is a schematic diagram of an in-plane X-axis detection mode of an acceleration sensor according to embodiment IV of the present disclosure.
Figure 19:
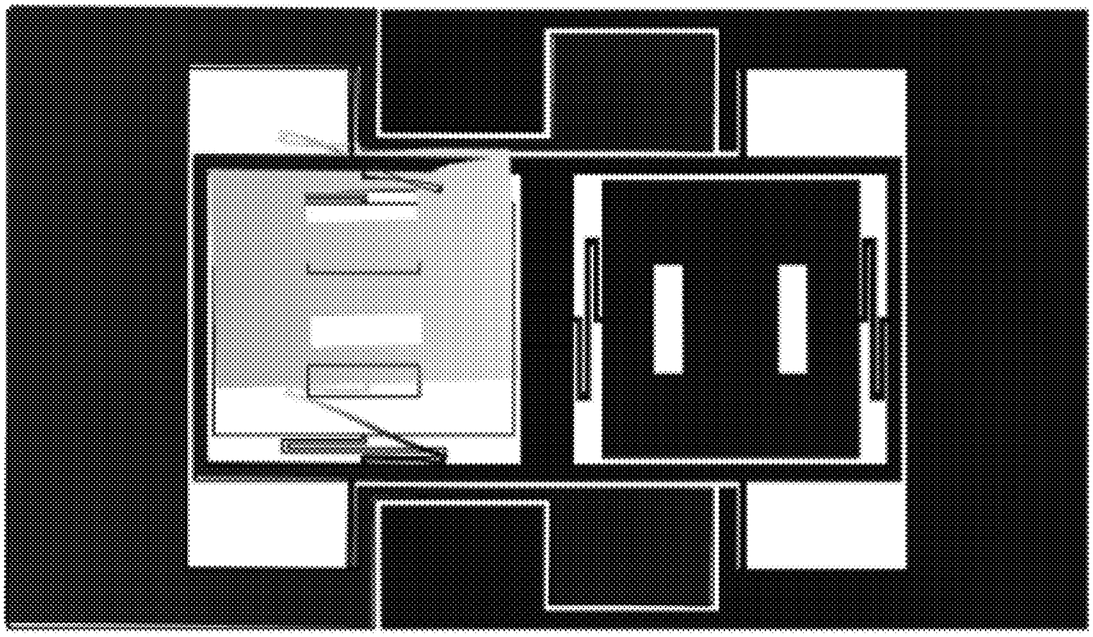
FIG. 19 is a schematic diagram of an in-plane Y-axis detection mode of an acceleration sensor according to embodiment IV of the present disclosure.
Figure 20:
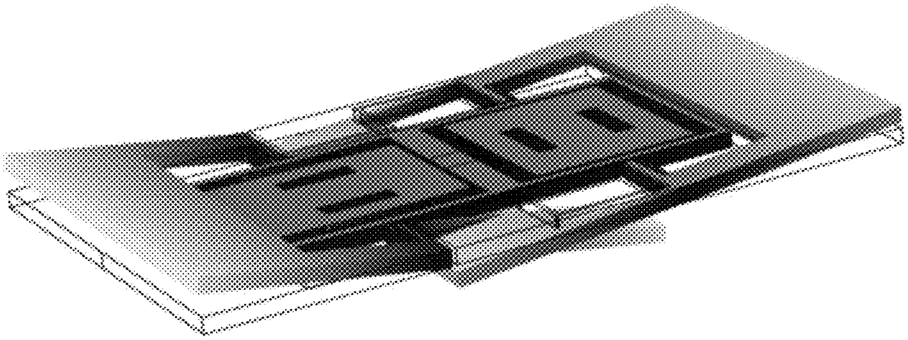
FIG. 20 is a schematic diagram of an out-of-plane Z-axis detection mode of an acceleration sensor according to embodiment IV of the present disclosure.
Figure 21:
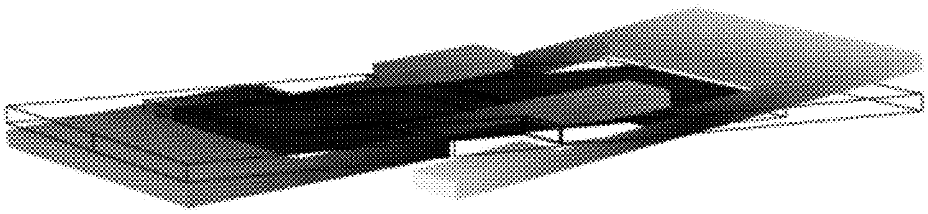
FIG. 21 is a schematic diagram of an out-of-plane Z-axis parasitic mode of an acceleration sensor according to embodiment IV of the present disclosure.
Figure 22:
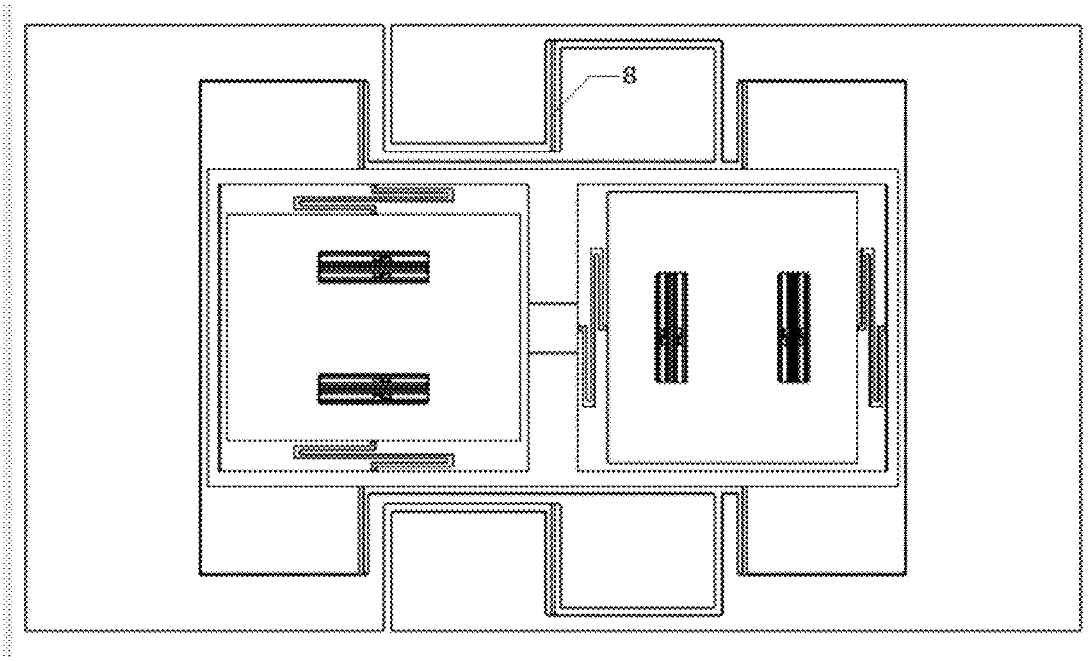
FIG. 22 is a structural schematic diagram of a coupling beam of an acceleration sensor according to embodiment IV of the present disclosure.

It should be noted that the in-plane X-axis direction detection mode refers to that the acceleration sensor is subjected to acceleration in the in-plane X-axis direction, referring to FIGS. 2, 7 and 18; the in-plane Y-axis direction detection mode refers to that the acceleration sensor is subjected to acceleration in the in-plane Y-axis direction, referring to FIGS. 11 and 19; the out-of-plane Z-axis direction detection mode refers to that the acceleration sensor is subjected to acceleration in the out-of-plane Z-axis direction, referring to FIGS. 3, 8, 12 and 20; and the out-of-plane Z-axis direction parasitic mode refers to that the acceleration sensor is subjected to acceleration in the out-of-plane Z-axis direction and Y-axis angular acceleration, referring to FIGS. 4, 9, 13 and 21.

It can be understood that the above-described implementations are merely exemplary implementations used for illustrating the principles of the embodiments of the present disclosure, but the present disclosure is not limited thereto. For those skilled in the art, various modifications and improvements may be made without departing from the essence of the present disclosure, and these modifications and improvements shall fall within a protection scope of the present disclosure.

What is claimed is:

1. An acceleration sensor, comprising:

a first acceleration detection unit configured to detect acceleration in an out-of-plane Z-axis direction, wherein the first acceleration detection unit comprises a first seesaw unit and a second seesaw unit, and the first seesaw unit and the second seesaw unit are arranged opposite to each other to define an annular structure;

a second acceleration detection unit configured to detect acceleration in an in-plane X-axis direction and/or in an in-plane Y-axis direction, wherein the annular structure surrounds an outer side of the second acceleration detection unit;

a base, a connection arm and a first anchor point, wherein the first anchor point is located at a middle part of the base, the connection arm is fixed to the base through the first anchor point, and the connection arm is located between the first acceleration detection unit and the second acceleration detection unit; and a first elastic member and a second elastic member, wherein the first acceleration detection unit is connected to the connection arm through the first elastic member, and the second acceleration detection unit is connected to the connection arm through the second elastic member, wherein the out-of-plane Z-axis direction, the in-plane X-axis direction and the in-plane Y-axis direction are perpendicular to each other, wherein the first acceleration detection unit further comprises an out-of-plane displacement detection unit;

wherein a middle part of a side of the connection arm close to the second acceleration detection unit is fixed to the first anchor point;

wherein the first seesaw unit is elastically connected to a first end of the connection arm, the second seesaw unit is elastically connected to a second end of the connection arm; each of the first seesaw unit and the second seesaw unit is symmetrically distributed about a symmetry axis of the acceleration sensor; the first seesaw unit comprises two first seesaw structures arranged at two sides of the symmetry axis, and the two first seesaw structures both rotate about a first rotation axis; the second seesaw unit comprises two second seesaw structures arranged at two sides of the symmetry axis, and the two second seesaw structures both rotate about a second rotation axis; the first rotation axis and the second rotation axis are arranged in parallel and are both perpendicular to the symmetry axis;

wherein each of the first seesaw unit and the second seesaw unit is provided with the out-of-plane displacement detection unit; and wherein a first groove is provided at an outer side of the first seesaw unit, and a second groove is provided at an inner side of the second seesaw unit; a part of the first seesaw unit is embedded into the second groove, a part of the second seesaw unit is embedded into the first groove, to form an embedded structure; and the embedded structure is located between the first rotation axis and the second rotation axis.

2. The acceleration sensor as described in claim 1, further comprising a first detection weight and a second detection weight;

wherein each first seesaw structure comprises a first rotating sub-portion and a second rotating sub-portion, the first rotating sub-portion and the second rotating sub-portion are located at two opposite sides of the first rotation axis, and the first groove is formed at an outer side of the second rotating sub-portion;

each second seesaw structure comprises a third rotating sub-portion and a fourth rotating sub-portion, the third rotating sub-portion and the fourth rotating sub-portion are located at two opposite sides of the second rotation axis, and the second groove is formed at an inner side of the third rotating sub-portion; and the first detection weight is located at the first rotating sub-portion, the second detection weight is located at the fourth rotating sub-portion, and the first detection weight and the second detection weight are symmetrically arranged.

3. The acceleration sensor as described in claim 2, further comprising a coupling beam, wherein the coupling beam extends in a direction perpendicular to the symmetry axis, an end of the coupling beam is connected to the second rotating sub-portion, and another end of the coupling beam is connected to the third rotating sub-portion.

4. The acceleration sensor as described in claim 1, wherein the second acceleration detection unit is configured to detect acceleration in the in-plane X-axis direction, the second elastic member is an X-axis single-degree-of-freedom spring distributed along the in-plane Y-axis direction, and the second acceleration detection unit is fixed to the connection arm through the X-axis single-degree-of-freedom spring;

the second acceleration detection unit comprises a first weight and a first capacitor group; the first weight is provided with first mounting grooves distributed along the in-plane Y-axis direction at intervals, and each of the first mounting grooves is provided with the first capacitor group;

the first capacitor group comprises a first positive fixed electrode and a first negative fixed electrode, and the first positive fixed electrode and the first negative fixed electrode are distributed along the in-plane Y-axis direction; a side, away from the first negative fixed electrode, of the first positive fixed electrode and the first weight form a first differential detection capacitor; and a side, away from the first positive fixed electrode, of the first negative fixed electrode and the first weight form a second differential detection capacitor.

5. The acceleration sensor as described in claim 1, wherein the second acceleration detection unit is configured to detect acceleration in the in-plane Y-axis direction, the second elastic member is a Y-axis single-degree-of-freedom spring distributed along the in-plane X-axis direction, and the second acceleration detection unit is fixed to the connection arm through the Y-axis single-degree-of-freedom spring;

the second acceleration detection unit comprises a second weight and a first capacitor group; the second weight is provided with second mounting grooves distributed along the in-plane X-axis direction at intervals, and each of the second mounting grooves is provided with the second capacitor group;

the second capacitor group comprises a second positive fixed electrode and a second negative fixed electrode, and the second positive fixed electrode and the second negative fixed electrode are distributed along the in-plane X-axis direction; a side, away from the second negative fixed electrode, of the second positive fixed electrode and the second weight form a third differential detection capacitor; and a side, away from the second positive fixed electrode, of the second negative fixed electrode and the second weight form a fourth differential detection capacitor.

6. The acceleration sensor as described in claim 1, wherein the annular structure surrounds an outer side of the connection arm;

wherein the connection arm is provided with a receiving groove for mounting the second acceleration detection unit; and wherein the first anchor point is located at a center of the connection arm.

7. The acceleration sensor as described in claim 6, wherein the connection arm is provided with two receiving grooves that are symmetrically arranged, wherein the two receiving grooves comprise the receiving groove.

8. The acceleration sensor as described in claim 7, wherein the acceleration sensor comprises a plurality of second acceleration detection units including the second acceleration detection unit;

wherein one of the second acceleration detection units is disposed in each of the receiving grooves; and wherein one of the second acceleration detection units is configured to detect acceleration in the X-axis direction; and another one of the second acceleration detection units is configured to detect acceleration in the Y-axis direction.

* * * * *